(12) United States Patent
Karaoguz et al.

(10) Patent No.: US 8,423,039 B2
(45) Date of Patent: *Apr. 16, 2013

(54) DYNAMIC RECONFIGURATION OF COMMUNICATION RESOURCES IN A MULTI-TRANSCEIVER CONFIGURATION

(75) Inventors: Jeyhan Karaoguz, Irvine, CA (US); Nambirajan Seshadri, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/768,879

(22) Filed: Apr. 28, 2010

(65) Prior Publication Data

US 2010/0210279 A1    Aug. 19, 2010

Related U.S. Application Data

(63) Continuation of application No. 11/092,194, filed on Mar. 29, 2005, now Pat. No. 7,711,374.

(60) Provisional application No. 60/601,341, filed on Aug. 13, 2004.

(51) Int. Cl.
*H04W 72/00* (2009.01)

(52) U.S. Cl.
USPC ............... 455/452.2; 455/67.13; 455/450; 455/452.1; 455/509; 455/561; 455/562.1; 375/299

(58) Field of Classification Search .......... 455/67.13, 455/452.1, 452.2, 450, 509, 561, 562.1; 375/299
See application file for complete search history.

(56) References Cited

U.S. PATENT DOCUMENTS

| 6,564,066 | B1 | 5/2003 | Biggs et al. |
| 6,744,743 | B2 | 6/2004 | Walton et al. |
| 6,751,187 | B2 | 6/2004 | Walton et al. |
| 6,802,035 | B2 * | 10/2004 | Catreux et al. ............... 714/746 |
| 7,047,016 | B2 | 5/2006 | Walton et al. |
| 7,280,804 | B2 | 10/2007 | Jacobsen et al. |

(Continued)

FOREIGN PATENT DOCUMENTS

CN    1215514    4/1999

OTHER PUBLICATIONS

European Search Report corresponding to European Patent Application No. 05011272, dated Dec. 2, 2009.

*Primary Examiner* — Raymond Dean
(74) *Attorney, Agent, or Firm* — Brinks Hofer Gilson & Lione

(57) ABSTRACT

A system and method that provide dynamic reconfiguration of communication resources in a multi-transceiver configuration. Various aspects of the present invention may comprise communicating a first portion of a first communication using a plurality of transceivers. A determination may be made to reallocate at least one of the plurality of transceivers for a second communication. A second portion of the first communication may be communicated using the plurality of transceivers less the reallocated transceiver(s), and the second communication may be communicated using at least the reallocated transceiver(s). Various aspects of the present invention may also comprise communicating a first communication utilizing a first transceiver and a second communication utilizing a second transceiver. A determination may be made to utilize the first and second transceivers in a MIMO configuration to communicate next information. The next information may then be communicated utilizing the first and second transceivers in a MIMO configuration.

32 Claims, 5 Drawing Sheets

U.S. PATENT DOCUMENTS

| | | |
|---|---|---|
| 7,299,070 B2 | 11/2007 | Karaoguz et al. |
| 7,301,924 B1 | 11/2007 | Gurbuz et al. |
| 7,440,777 B2 | 10/2008 | Karaoguz et al. |
| 7,565,173 B2 | 7/2009 | Karaoguz et al. |
| 7,711,374 B2 * | 5/2010 | Karaoguz et al. .......... 455/452.2 |
| 2002/0193146 A1 | 12/2002 | Wallace et al. |
| 2003/0087673 A1 | 5/2003 | Walton et al. |
| 2003/0128658 A1 | 7/2003 | Walton et al. |
| 2003/0223391 A1 | 12/2003 | Malaender et al. |
| 2004/0176097 A1 | 9/2004 | Wilson et al. |
| 2005/0047384 A1 | 3/2005 | Wax et al. |
| 2005/0101352 A1 | 5/2005 | Logothetis et al. |
| 2005/0170862 A1 | 8/2005 | Fukushima |
| 2005/0232208 A1 | 10/2005 | Hansen |
| 2006/0035674 A1 | 2/2006 | Karaoguz et al. |
| 2006/0035675 A1 | 2/2006 | Karaoguz et al. |
| 2006/0121946 A1 | 6/2006 | Walton et al. |
| 2008/0002781 A1 | 1/2008 | Karaoguz et al. |
| 2009/0042614 A1 | 2/2009 | Karaoguz et al. |
| 2009/0280821 A1 | 11/2009 | Karaoguz et al. |

* cited by examiner

DYNAMIC RECONFIGURATION OF COMMUNICATION RESOURCES IN A MULTI-TRANSCEIVER CONFIGURATION

CROSS-REFERENCE TO RELATED APPLICATIONS/INCORPORATION BY REFERENCE

This patent application is a continuation of U.S. patent application Ser. No. 11/092,194, filed on Mar. 29, 2005, which makes reference to, claims priority to and claims benefit from provisional patent application Ser. No. 60/601,341, filed Aug. 13, 2004, and titled "DYNAMIC RECONFIGURATION OF COMMUNICATION PATHWAYS IN A MULTI-TRANSCEIVER CONFIGURATION". The contents of each of the aforementioned patent applications are hereby incorporated herein by reference in their entirety. This patent application is related to U.S. patent application Ser. No. 11/092,349, filed Mar. 29, 2005, now U.S. Pat. No. 7,440,777; U.S. patent application Ser. No. 12/250,119, filed Oct. 13, 2008, entitled "MULTI-TRANSCEIVER SYSTEM WITH MIMO AND BEAM-FORMING CAPABILITY"; U.S. patent application Ser. No. 11/092,383, filed Mar. 29, 2005, now U.S. Pat. No. 7,299,070; U.S. patent application Ser. No. 11/855,252, filed Jul. 21, 2009, now U.S. Pat. No. 7,565,173; and U.S. patent application Ser. No. 12/506,944, entitled "DYNAMIC MIMO RESOURCE ALLOCATION DURING A SINGLE COMMUNICATION".

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Various communication systems may have a single antenna and utilize single transmission path communications for communicating information. In various scenarios, multiple transmission path communications may be preferable to single transmission path communications. Such scenarios may comprise any of a large variety of factors that may, separately or in aggregate, cause multiple transmission path communications to be preferable.

Various communication systems may have multiple antennas and utilize multiple transmission path communications for communicating information. In various scenarios, single transmission path communications may be preferable to multiple transmission path communications. Such scenarios may comprise any of a large variety of factors that may, separately or in aggregate, cause single transmission path communications to be preferable.

In various communication systems, particularly communication systems with time-varying communication conditions (e.g., natural or man-made conditions), the communication conditions may vary across various communications and also within single communications. Present communication systems (e.g., current multi-transceiver systems) do not adequately adapt to compensate for varying communication conditions.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method that provide dynamic reconfiguration of communication resources in a multi-transceiver configuration, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
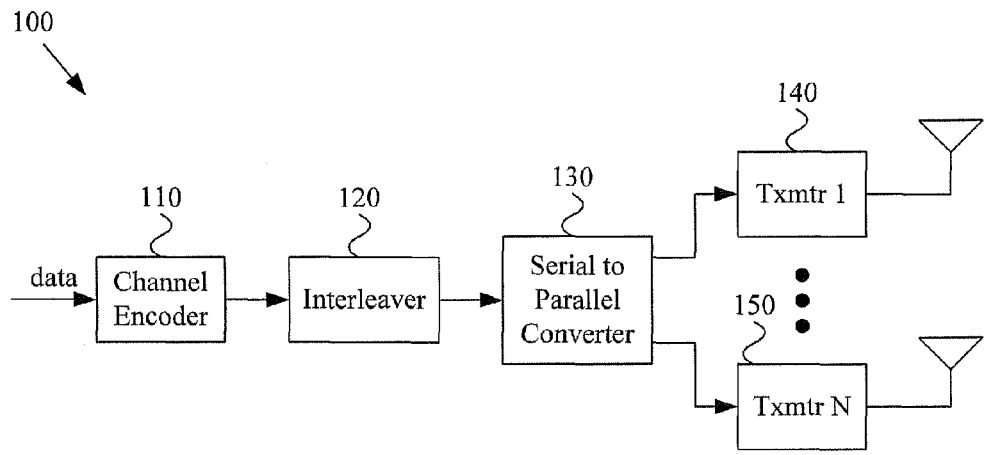
FIG. 1 is a diagram illustrating an exemplary MIMO transmitting configuration.
Figure 2:
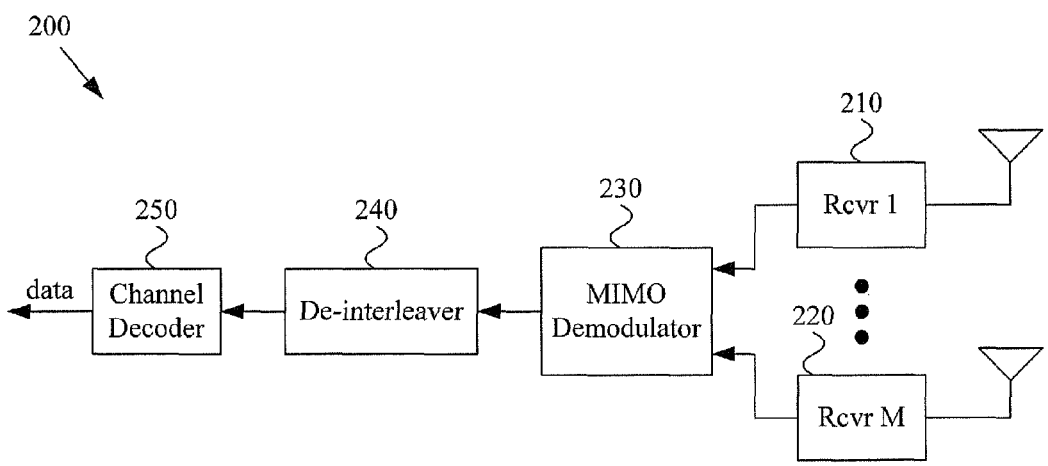
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited by characteristics of particular MIMO system configurations.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, etc. The channel encoder 110 may comprise any of a variety of encoder types. For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210-220 may provide the simultaneously received signals to a MIMO demodulator 230. The MIMO demodulator 230 may provide a serial stream of information to a de-interleaver 240 and to a channel decoder 250 to convert the received signals into output data.

Note that the exemplary MIMO systems illustrated in FIGS. 1 and 2 are merely illustrative examples of basic MIMO systems. It should be noted that a MIMO system might comprise many various alternative configurations. Further, it should be noted that various characteristics of MIMO systems may be shared with MISO systems.

Figure 3:
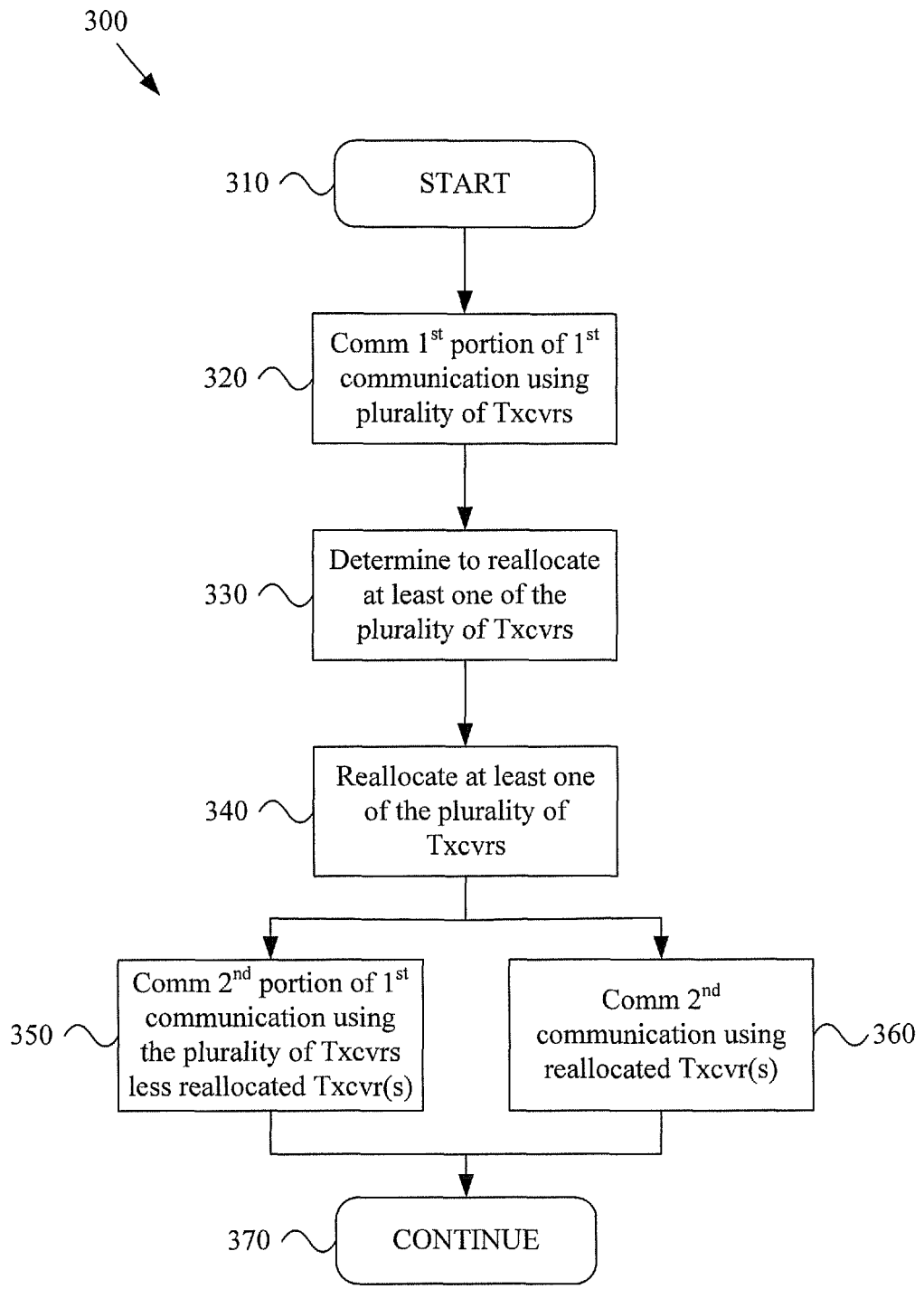
FIG. 3 is a flow diagram illustrating an exemplary method for managing communication resources in a multi-transceiver communication system configuration, in accordance with various aspects of the present invention.

FIG. 3 is a flow diagram illustrating an exemplary method 300 for managing communication resources in a multi-transceiver communication system configuration, in accordance with various aspects of the present invention.

The exemplary method 300 (and the exemplary methods 400-500, to be discussed later) may be implemented by any of a variety of multi-transceiver communication systems (e.g., communication systems having MIMO communication capability). For example and without limitation, the method 300, or portions thereof, may be implemented by various modules or systems of a MIMO communication network (e.g., a base station, access point, or central controller). Also for example, the method 300 may be implemented by a fixed or portable MIMO communication system that communicates with a MIMO communication network. Accordingly, the scope of various aspects of the present invention should not be limited by characteristics of a particular communication system that may implement the exemplary method 300 or other methods discussed herein.

The following discussion may refer to communicating a "communication." A communication may generally be considered to correspond to communicating an amount of related information between two or more communication systems. For example, a communication may comprise communicating a known amount of related information (e.g., a packet, bit, symbol, data frame, message, song, program, music video, movie, timed segment of a communication (e.g., n-seconds of a phone conversation), etc.). Also for example, a communication may comprise communicating related two-way information between parties (e.g., a video conference or telephone call). Further for example, a communication may comprise all communications conducted over a particular communication channel or set of channels (e.g., a broadcast, multicast or unicast television or radio channel). Communicated information may comprise characteristics of any of a variety of types of information (e.g., textual, graphical, multi-media, video, audio, pictorial, general data, telephone call, etc.). The scope of various aspects of the present invention should not be limited by characteristics of a particular type of information or by any arbitrary notion of what a particular communication between communicating systems may comprise.

Portions of the following discussion will include illustrations of a communication system implementing the exemplary method 300 communicating with one or more other communication systems. Such one-to-one or one-to-two communication scenarios are presented for illustrative clarity and should not limit the scope of various aspects of the present invention to characteristics of one-to-one or one-to-two communication scenarios. For example and without limitation, various aspects of the present invention are readily extensible to broadcast and multi-cast communication scenarios. Additionally, portions of the following discussion may focus on the transmission of information or the reception of information, depending on the particular scenario. It should be noted that providing an illustration based on transmission or reception should not limit the scope of various aspects of the present invention to one of transmission or reception. Various aspects of the present invention are readily extensible to receiving and/or transmitting information.

The exemplary method 300 may begin executing at step 310. The exemplary method 300 (and other methods discussed herein, for example, exemplary methods 400-500) may begin executing for any of a variety of reasons. For example and without limitation, the exemplary method 300 may begin in response to a user or automated input initiating a communication. Also for example, the exemplary method 300 may begin in response to a message arriving from another communication system. Further for example, the exemplary method 300 may begin in response to one or more detected or determined communication environment conditions. Still further for example, the exemplary method 300 may begin in response to timer expiration. Accordingly, the scope of various aspects of the present invention should not be limited by characteristics of any particular initiating cause or condition.

The exemplary method 300 may, at step 320, comprise communicating a first portion of a first communication using a plurality of transceivers of the communication system. Step 320 may comprise communicating the first portion of the first communication using a plurality of transceivers in any of a variety of manners.

For example and without limitation, step 320 may comprise utilizing the plurality of transceivers to communicate the first portion of the first communication in a MIMO mode. In a non-limiting exemplary scenario, step 320 may comprise communicating MIMO set-up and/or training information prior to communicating the first portion of the first communication. Also in various exemplary scenarios, step 320 may comprise utilizing the plurality of transceivers to communicate the first portion of the first communication in a MISO or beam-forming mode. Note that step 320 does not necessarily, but may, comprise utilizing all transceivers of the radio. Accordingly, the scope of various aspects of the present invention should not be limited by characteristics of any particular manner of using a plurality of transceivers of a communication system to communicate information.

The exemplary method 300 may, at step 330, comprise determining to reallocate (or redeploy or reassign) at least one of the plurality of transceivers for a second communication. Step 330 may comprise determining to reallocate at least one of the plurality of transceivers for a second communication in any of a variety of manners.

For example and without limitation, step 330 may comprise determining the communication quality associated with communicating a second portion of the first communication using the plurality of transceivers (e.g., as utilized at step 320) less the candidate transceiver(s) to be reallocated. Such communication quality may be reflected in any of a large variety of communication quality metrics (e.g., error rate, data rate, noise level, signal-to-noise ratio, clarity, accuracy, to name a few non-limiting examples). Step 330 may then, for example, comprise determining whether to reallocate the candidate transceiver(s) for a second communication based, at least in part, on the determined communication quality.

In a first non-limiting exemplary scenario, step 330 may comprise determining that the communication quality associated with communicating a second portion of the first communication using the plurality of transceivers less the candidate transceiver(s) would result in a 15% reduction in communication quality between the first and second portions of the first communication. Step 330 may then comprise determining whether the 15% reduction in communication quality is acceptable (e.g., in light of other communication goals and/or needs). Upon determining that the 15% reduction in communication quality is acceptable (e.g., the present communication quality is more than 15% above the minimum acceptable quality), step 330 may comprise reallocating the candidate transceiver(s) to the second communication.

In a second non-limiting exemplary scenario, step 330 may comprise determining that the communication quality associated with communicating a second portion of the first communication using the plurality of transceivers less the candidate transceiver(s) would result in a 10% reduction in communication quality between the first and second portions of the first communication. Step 330 may then comprise determining whether the 10% reduction in communication quality is acceptable (e.g., in light of other communication goals and/or needs). Upon determining that the 10% reduction in communication quality is not acceptable (e.g., the present communication quality is only 5% above the minimum acceptable quality), step 330 might comprise determining not to reallocate the candidate transceiver(s) (e.g., executing an alternative method).

Also for example and without limitation, step 330 may comprise determining to reallocate at least one of the plurality of transceivers for a second communication based on at least one of: energy (or power) utilization, energy (or power) availability, signal quality, operational cost, data rate, negotiations between communicating systems, and explicit command. Due to their well-known relationship to each other, the following discussion may, at times, utilize the terms "energy" and "power" interchangeably.

In a non-limiting exemplary scenario, step 330 may comprise determining power utilization corresponding to communicating the first communication utilizing the plurality of transceivers and utilizing the plurality of transceivers less the candidate transceiver(s) for reallocation. Step 330 may also, for example, comprise determining power utilization corresponding to communicating the second communication utilizing the candidate transceiver(s). Step 330 may further, for example, comprise determining present and/or future power availability. Step 330 may then, for example, comprise analyzing present and/or anticipated power utilization and present and/or anticipated power availability to determine the most appropriate transceiver allocation from an power viewpoint (e in light of various communication quality goals).

In another non-limiting exemplary scenario, step 330 may comprise determining operational cost associated with particular transceiver allocations. Such costs may, for example, comprise monetary costs associated with communicating through particular communication networks, using particular communication modes, or using particular amounts of communication bandwidth. For example, step 330 may comprise determining that reallocating one or more of the plurality of transceivers from the first communication to a second communication would correspond to an operating cost savings while still meeting minimum quality goals. In another example, step 330 may comprise determining to reallocate one or more of the plurality of transceivers based on optimizing operating costs while meeting minimum quality goals.

In still another non-limiting exemplary scenario, step 330 may comprise negotiating between communicating systems to determine and analyze communication capabilities of communicating systems. For example, reallocating (or not reallocating) one or more of the plurality of transceivers may adversely affect other communicating systems. Step 330 may comprise communicating with other communication systems to determine the needs and/or desires of the other communication systems with which the communication system implementing the exemplary method 300 is communicating. Step 330 may then, for example, comprise determining to reallocate (or redeploy or reassign) at least one of the plurality of transceivers for a second communication based, at least in part, on information obtained through such negotiations.

In yet another non-limiting exemplary scenario, step 330 may comprise receiving and analyzing user input to determine whether to reallocate one or more of the plurality of transceivers for a second communication. For example, a user may require that a particular number or particular minimum number of transceivers be utilized for the first and/or second communications. Step 330 may, for example, comprise interfacing with the user to obtain such user input.

In general, step 330 may comprise determining to reallocate at least one of the plurality of transceivers (e.g., utilized for communicating a first portion of the first communication at step 320) for a second communication. Accordingly, the scope of various aspects of the present invention should not be limited by characteristics of any particular transceiver reallocation or any particular manner of determining whether to perform such reallocation.

The exemplary method 300 may, at step 340, comprise reallocating the at least one of the plurality of transceivers for performing the second communication (e.g., the one or more transceivers that step 330 determined to reallocate). Step 340 may comprise performing such reallocation in any of a variety of manners.

Step 340 may, for example, comprise maintaining a cross-list of transceivers to respective communications. Also for example, step 340 may comprise maintaining allocation flags, arrays and/or tables. Step 340 may also, for example, comprise communicating communication support information (e.g., protocol information, secure communication information, MIMO training information, etc.). Step 340 may also, for example, comprise controlling the routing of communication signals between various communication support modules and transceivers. Accordingly, the scope of various aspects of the present invention should not be limited by characteristics of any particular manner of reallocating one or more transceivers from one communication to another.

The exemplary method 300 may, at step 350, comprise communicating a second portion of the first communication using the plurality of transceivers less the reallocated at least one of the plurality of transceivers (e.g., as reallocated at step 340). Step 350 may comprise performing such communication in any of a variety of manners.

In a non-limiting exemplary scenario, step 320 may comprise utilizing N transceivers to communicate the first portion of the first communication. Steps 330 and 340 then reallocate M of the N transceivers to a second communication, leaving N-M transceivers for communicating a second portion of the first communication. Step 350 may then, for example, comprise utilizing the N-M transceivers in a MIMO configuration to communicate the second portion of the first communication. In doing so, step 350 may, for example prior to communicating the second portion of the first communication, comprise communicating MIMO training information for use with order N-M MIMO communications. Also, step 350 may, for example, comprise communicating various types of information to synchronize communication of the second portion of the first communication with the first portion.

In another non-limiting exemplary scenario, step 320 may comprise utilizing N transceivers to communicate the first portion of the first communication. Steps 330 and 340 then reallocate N−1 of the N transceivers to a second communication, leaving one transceiver for communicating a second portion of the first communication. Step 350 may then, for example prior to communicating the second portion of the first communication, comprise communicating various communication support information (e.g., protocol and decoding information). Also, step 350 may, for example, comprise communicating various types of information to synchronize communication of the second portion of the first communication with the first portion.

In general, step 350 may comprise communicating a second portion of the first communication using the plurality of transceivers (e.g., utilized at step 320) less the reallocated at least one of the plurality of transceivers (e.g., as reallocated at step 340). Accordingly, the scope of various aspects of the present invention should not be limited by characteristics of any particular manner of using a plurality of transceivers (or a single transceiver) for communicating information or by any particular manner of synchronizing communication of separate portions of a communication.

The exemplary method 300 may, at step 360, comprise communicating the second communication using the reallocated at least one of the plurality of transceivers concurrently with (e.g., simultaneously with) communicating the second portion of the first communication. Step 360 may comprise performing such communication in any of a variety of manners. For example and without limitation, step 360 may share various characteristics with step 350.

For example, step 360 may comprise communicating the second communication from the beginning of the second communication. Also for example, step 360 may comprise communicating a second portion of the second communication, where the first portion of the second communication might have already been communicated (e.g., without the transceiver(s) reallocated at step 340).

In a non-limiting exemplary scenario, step 320 may comprise utilizing N transceivers to communicate the first portion of the first communication. Steps 330 and 340 then reallocate M of the N transceivers to a second communication, leaving N-M transceivers for communicating a second portion of the first communication. Step 360 may then, for example, comprise using (i.e., at least using) the M reallocated transceivers in a MIMO configuration to communicate the second communication (or a portion thereof). In doing so, step 360 may, for example prior to communicating the second communication, comprise communicating MIMO training information for use with order-M (or higher order) MIMO communications. Also, in an exemplary scenario where a first portion of the second communication has already been communicated, step 360 may, for example, comprise communicating any of a variety of synchronization information to be utilized to synchronize communication of the first and second portions of the second communication.

In general, step 360 may comprise communicating the second communication using the reallocated at least one of the plurality of transceivers concurrently with (e.g., simultaneously with) communicating the second portion of the first communication. Accordingly, the scope of various aspects of the present invention should not be limited by characteristics of any particular manner of using a plurality of transceivers (or a single transceiver) for communicating information or by any particular manner of synchronizing communication of separate portions of a communication.

The exemplary method 300 may, at step 370, comprise performing continued processing. Various steps of exemplary methods 400 and 500, to be discussed later, may also perform such continued processing. Such continued processing might comprise characteristics of any of a large variety of continued processing. For example and without limitation, step 370 might comprise completing communication of the first and second communications.

Step 370 may also, for example and without limitation, comprise performing user interface functions. Step 370 may also, for example, comprise monitoring communication quality and/or communication conditions associated with the first and/or second communications. Step 370 may also, for example, comprise waiting for additional communication to be requested. Also for example, step 370 may comprise looping execution of the method 300 back up to step 330 for re-determination of transceiver allocation (e, to communicate additional communications, or portions thereof, or in response to detected communication conditions). Accordingly, the scope of various aspects of the present invention should not be limited by particular types of continued processing that may be performed by a system implementing the exemplary method 300.

The exemplary method 300 was presented to provide specific illustrations of generally broader aspects of the present invention. Accordingly, the scope of various aspects of the present invention should not be limited by specific characteristics of the exemplary method 300.

Figure 4:
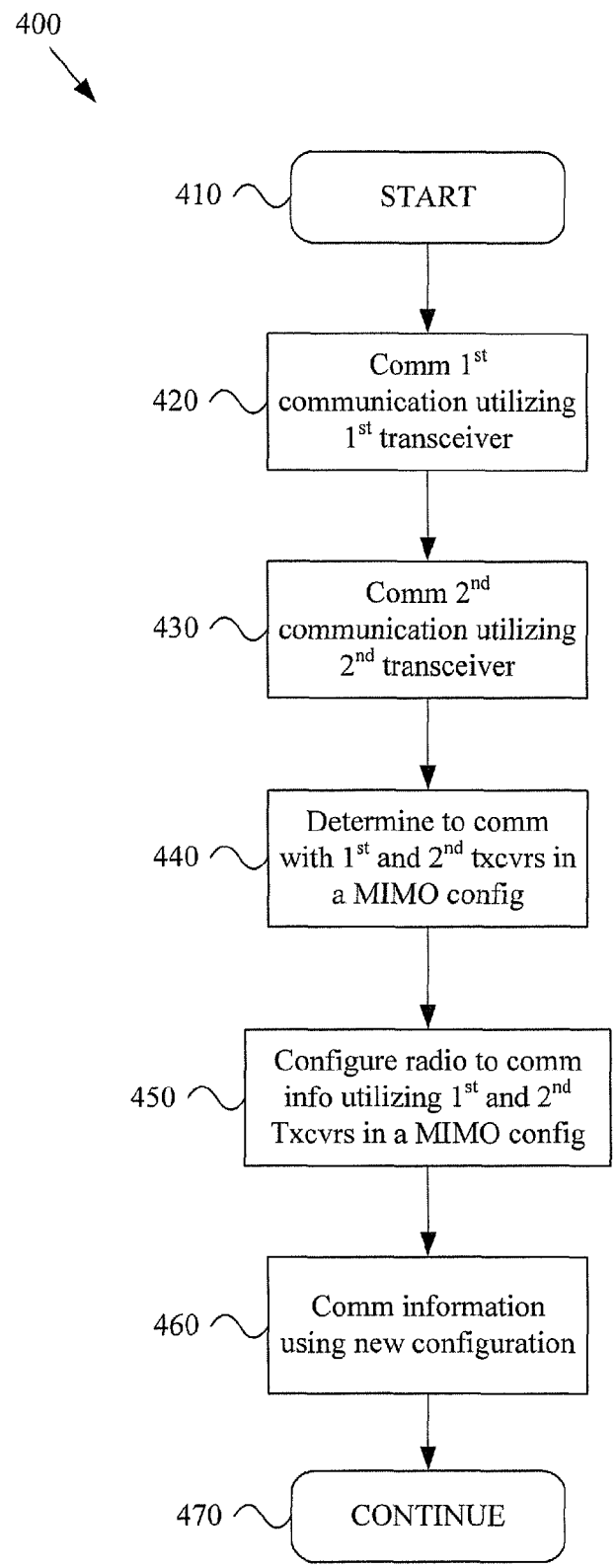
FIG. 4 is a flow diagram illustrating an exemplary method for managing communication resources in a multi-transceiver communication system configuration, in accordance with various aspects of the present invention.

FIG. 4 is a flow diagram illustrating an exemplary method 400 for managing communication resources in a multi-transceiver communication system configuration, in accordance with various aspects of the present invention. The exemplary method 400 may, for example and without limitation, share various characteristics with the exemplary method 300 illustrated in FIG. 3 and discussed previously.

The exemplary method 400 may, at step 420, comprise communicating a first communication utilizing a first transceiver of a plurality of transceivers of the communication system. Step 420 may, for example and without limitation, share various characteristics with steps 320, 350 and 360 of the exemplary method 300 illustrated in FIG. 3 and discussed previously.

Step 420 may comprise communicating the first communication utilizing the first transceiver in any of a variety of manners. For example and without limitation, step 420 may comprise communicating the first communication utilizing the first transceiver in a Single-Input-Single-Output ("SISO") configuration. Also for example, step 420 may comprise communicating the first communication utilizing the first transceiver (and other transceivers) in a MIMO or Multiple-Input-Single-Output ("MISO") configuration. Accordingly, the scope of various aspects of the present invention should not be limited by characteristics of any particular manner of utilizing one or more transceivers to communicate.

The exemplary method 400 may, at step 430, comprise communicating a second communication utilizing a second transceiver of the plurality of transceivers of the communication system. Step 430 may, for example and without limitation, share various characteristics with steps 320, 350 and 360 of the exemplary method 300 illustrated in FIG. 3 and discussed previously.

Step 430 may comprise communicating the second communication utilizing the second transceiver in any of a variety of manners. For example and without limitation, step 430 may comprise communicating the second communication utilizing the second transceiver in a SISO configuration. Also for example, step 430 may comprise communicating the second communication utilizing the second transceiver in a MIMO or MISO configuration.

Step 430 may, for example and without limitation, comprise communicating the second communication concurrently with (e.g., simultaneously with) communicating at least a portion of the first communication (e.g., at step 420). In an alternative exemplary scenario, step 430 may comprise communicating the second communication consecutively with communication of the first communication.

In general, step 430 may comprise communicating a second communication utilizing a second transceiver of the plurality of transceivers of the communication system. Accordingly, the scope of various aspects of the present invention should not be limited by characteristics of any particular manner of utilizing one or more transceivers to communicate.

The exemplary method 400 may, at step 440, comprise determining to utilize the first and second transceivers in a MIMO configuration (e.g., with or without other transceivers) to communicate information. Step 440 may, for example and without limitation, share various characteristics with step 330 of the exemplary method 300 illustrated in FIG. 3 and discussed previously. Step 440 may comprise making such determination in any of a variety of manner.

Note that the information, which step 440 determines to communicate utilizing at least the first and second transceivers in a MIMO configuration, may comprise a second portion of the first communication (e.g., as communicated at step 420) and/or a second portion of the second communication (e.g., as communicated at step 430). Alternatively, for example, the information may comprise information independent of the first communication and second communication.

For example and without limitation, step 440 may comprise determining the communication quality associated with communicating the communication utilizing none, either or both of the first and second transceivers. Step 440 may then, for example, comprise determining whether to utilize at least the first and second transceivers in a MIMO configuration based, at least in part, on the determined communication quality.

For example, step 440 may comprise determining first communication quality associated with utilizing one of the first and second transceivers in a SISO configuration. Step 440 may then, for example, comprise determining second communication quality associated with utilizing the first and second transceivers in a MIMO configuration. Step 440 may then, for example, comprise determining whether to utilize the first and second transceivers in a MIMO configuration based, at least in part, on the first communication quality and the second communication quality.

In a non-limiting exemplary scenario, step 440 may comprise determining that the communication quality associated with communicating the communication using both of the first and second transceivers in a MIMO configuration would result in a 15% increase in communication quality relative to utilizing either of the first and second transceivers individually. Step 440 may then comprise determining whether the 15% increase in communication quality (e.g., in light of other communication goals and/or needs) warrants utilizing both of the first and second transceivers in a MIMO configuration. Upon determining that the 15% increase in communication quality warrants utilizing both transceivers in a MIMO configuration, step 440 might comprise determining to communicate using the first and second transceivers in a MIMO configuration.

In another non-limiting exemplary scenario, step 440 may comprise determining that the communication quality associated with communicating the communication using both of the first and second transceivers in a MIMO configuration would result in a 2% increase in communication quality relative to utilizing either of the first and second transceivers individually. Step 440 may then comprise determining whether a 2% increase in communication quality (e.g., in light of other communication goals and/or needs) warrants utilizing both of the first and second transceivers in a MIMO configuration. Upon determining that the 2% increase in communication quality does not warrant utilizing both transceivers in a MIMO configuration (e.g., the 2% increase in quality is not worth removing both transceivers from the available pool), step 440 might comprise determining not to utilize both of the first and second transceivers in a MIMO configuration.

Also for example and without limitation, step 440 may comprise determining whether to utilize the first and second transceivers in a MIMO configuration based on at least one of: energy (or power) utilization, energy (or power) availability, signal quality, operational cost, data rate, negotiations between communicating systems, and explicit command.

In a non-limiting exemplary scenario, step 440 may comprise determining power utilization corresponding to communicating the communication utilizing the first and/or second transceivers individually or together in a MIMO configuration (e.g., only the first and second transceiver, or in combination with other transceivers). Step 440 may further, for example, comprise determining present and/or future power availability. Step 440 may then, for example, analyze present and/or anticipated power utilization and present and/or anticipated power availability to determine the most appropriate transceiver utilization from a power viewpoint (e.g., in light of communication quality goals).

In another non-limiting exemplary scenario, step 440 may comprise determining operational cost associated with particular transceiver utilizations. Such costs may, for example, comprise monetary costs associated with communicating through particular communication networks, using particular communication modes, or using particular amounts of communication bandwidth. For example, step 440 may comprise determining that utilizing the first and second transceivers in a MIMO configuration would correspond to an operating cost savings while still meeting minimum quality goals. In another example, step 440 may comprise determining to utilize only one of the first and second transceivers based on optimizing operating costs while meeting minimum quality goals.

In still another non-limiting exemplary scenario, step 440 may comprise negotiating between communicating systems to determine and analyze communication capabilities of communicating systems. For example, utilizing one or both of the first and second transceivers may positively or adversely affect other communicating systems. Step 440 may comprise communicating with other communication systems to determine the needs and/or desires of the other communication systems with which the communication system implementing the exemplary method 400 is communicating. Step 440 may then, for example, comprise determining to reallocate (or redeploy or reassign) at least one of the plurality of transceivers for a second communication based, at least in part, on information obtained through such negotiations.

In yet another non-limiting exemplary scenario, step 440 may comprise receiving and analyzing user input to determine whether to utilize one of the first and second transceivers individually or together in a MIMO configuration (e.g., with or without other transceivers). For example, a user may require that a particular number or particular minimum number of transceivers be utilized for the communication. Also for example, a user may require that only single transceiver communication or only MIMO communication be utilized for the communication. Step 440 may, for example, comprise interfacing with the user to obtain such user input.

In general, step 440 may comprise determining to utilize the first and second transceivers in a MIMO configuration (e.g., with or without other transceivers) to communicate information. Accordingly, the scope of various aspects of the present invention should not be limited by characteristics of any particular manner of determining whether to utilize the first and second transceivers in a MIMO configuration.

The exemplary method 400 may, at step 450, comprise configuring the communication system to communicate information utilizing at least the first and second transceivers in a MIMO configuration. Step 450 may, for example and without limitation, share various characteristics with step 340 of the exemplary method 300 illustrated in FIG. 3 and discussed previously.

Step 450 may comprise configuring the communication system in any of a variety of manners. For example and without limitation, step 450 may comprise maintaining a cross-list of transceivers to respective communications. Also for example, step 450 may comprise maintaining allocation flags, arrays and/or tables. Step 450 may also, for example, comprise controlling the routing of communication signals between various MIMO support modules and the first and second transceivers.

Step 450 may also, for example, comprise communicating MIMO training information between communicating systems. Step 450 may further, for example, comprise communicating any of a variety of communication support information, which may be utilized for initiating a new communication or for continuing an existing communication. Accordingly, the scope of various aspects of the present invention should not be limited by characteristics of a particular manner of configuring a communication system to communicate information in a MIMO mode.

The exemplary method 400 may, at step 460, comprise communicating the information utilizing at least the first and second transceivers in a MIMO configuration. Step 460 may, for example and without limitation, share various characteristics with steps 320, 350 and 360 of the exemplary method 300 illustrated in FIG. 3 and discussed previously. Step 460 may, for example, comprise communicating the information utilizing at least the first and second transceivers in a MIMO configuration in any of a variety of known, or yet to be developed manners.

The exemplary method 400 may, at step 470, comprise performing continued processing. Step 470 may, for example and without limitation, share various characteristics with step 370 of the exemplary method 300 illustrated in FIG. 3 and discussed previously. Such continued processing may comprise characteristics of any of a large variety of types of continued processing. For example and without limitation, step 470 may comprise completing communication of the communication utilizing at least the first and second transceivers in a MIMO configuration.

Step 470 may also, for example and without limitation, comprise performing user interface functions. Step 470 may also, for example, comprise monitoring communication quality and/or communication conditions associated with the communication(s). Step 470 may also, for example, comprise waiting for additional communication to be requested. Also for example, step 470 may comprise looping execution of the method 400 back up to step 440 for re-determination of transceiver utilization (e.g., to communicate additional units of information, or portions thereof, or in response to detected communication conditions). Accordingly, the scope of various aspects of the present invention should not be limited by particular types of continued processing that may be performed by a system implementing the exemplary method 400.

The exemplary method 400 was presented to provide specific illustrations of generally broader aspects of the present invention. Accordingly, the scope of various aspects of the present invention should not be limited by specific characteristics of the exemplary method 400.

Figure 5:
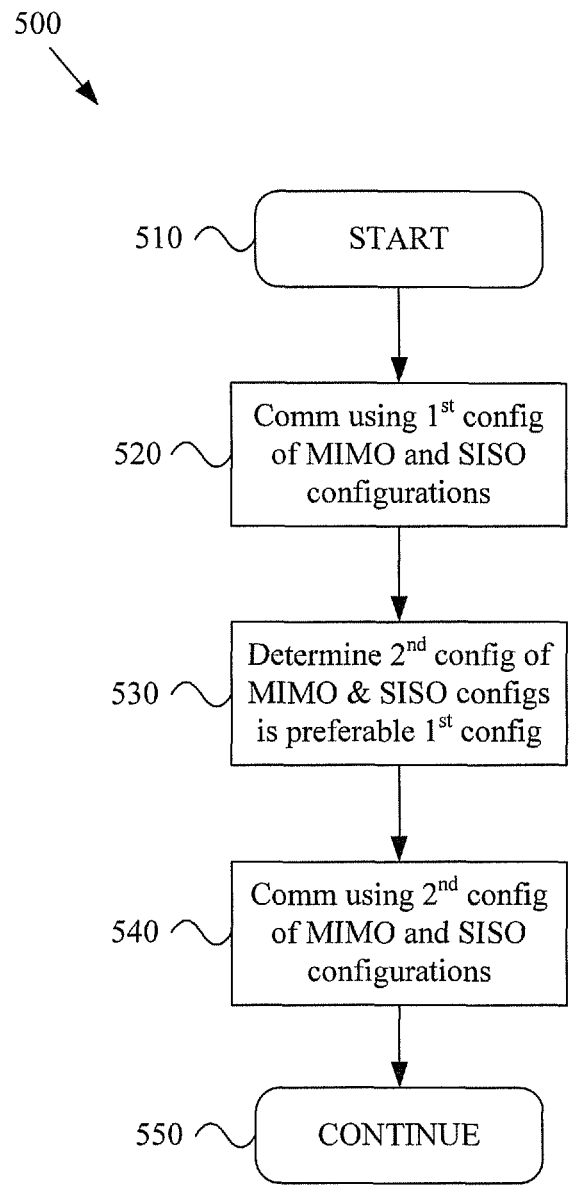
FIG. 5 is a flow diagram illustrating an exemplary method for managing communication resources in a multi-transceiver communication system configuration, in accordance with various aspects of the present invention.

FIG. 5 is a flow diagram illustrating an exemplary method 500 for managing communication resources in a multi-transceiver communication system configuration, in accordance with various aspects of the present invention. The exemplary method 500 may, for example and without limitation, share various characteristics with the exemplary methods 300-400 illustrated in FIGS. 3-4 and discussed previously.

The exemplary method 500 may, at step 520, comprise communicating using at least one of a plurality of transceivers of the communication system in a first configuration of a SISO configuration and a MIMO configuration. Step 520 may, for example and without limitation, share various characteristics with steps 320, 350, 360, 420, 430 and 460 of the exemplary methods 300-400 illustrated in FIGS. 3-4 and discussed previously.

Step 520 may comprise communicating using at least one of the plurality of transceivers of the communication system in any of a variety of manners. In a first non-limiting exemplary scenario, step 520 may comprise utilizing one of the plurality of transceivers in a SISO configuration to communicate a communication (or a first portion thereof). Step 520 may, for example, comprise performing such communication in any of a variety of manners associated with SISO communications. For example, step 520 may comprise routing information or signals between various SISO modules (or portions thereof) in the communication system and the one of the plurality of transceivers.

In a second non-limiting exemplary scenario, step 520 may comprise utilizing more than one of the plurality of transceivers in a MIMO configuration to communicate a communication (or a first portion thereof). Step 520 may, for example, comprise performing such communication in any of a variety of manners associated with MIMO communications. For example, step 520 may comprise routing information or signals between various MIMO modules (or portions thereof) in the communication system and the more than one of the plurality of transceivers.

In general, step 520 may comprise communicating using at least one of a plurality of transceivers of the communication system in a first configuration of a SISO configuration and a MIMO configuration. Accordingly, the scope of various aspects of the present invention should not be limited by characteristics of any particular manner of communicating using a SISO or MIMO configuration.

The exemplary method 500 may, at step 530, comprise determining that a second configuration of the SISO configuration and the MIMO configuration is preferable to the first configuration. Step 530 may, for example and without limitation, share various characteristics with steps 330 and 440 of the exemplary methods 300-400 illustrated in FIGS. 3-4 and discussed previously.

Step 530 may comprise determining that a second configuration of the SISO configuration and the MIMO configuration is preferable to the first configuration in any of a variety of manners, non-limiting examples of which are provided below.

For example and without limitation, step 530 may comprise determining a first communication quality associated with communicating utilizing a first of the SISO and MIMO configurations and a second communication quality associated with communicating utilizing a second of the SISO and MIMO configurations. Step 530 may then, for example, comprise determining whether to utilize the first or the second of the SISO and MIMO configurations based, at least in part, on the determined first and second communication qualities.

In a first non-limiting exemplary scenario, step 530 may comprise determining that the communication quality associated with communicating utilizing a second of the SISO and MIMO configurations would result in a 15% higher communication quality than communicating utilizing the first of the SISO and MIMO configurations (e.g., as utilized at step 520). Step 530 may then comprise determining whether the 15% higher communication quality is desirable (e.g., in light of other communication goals and/or needs). Upon determining that the 15% higher communication quality is desirable (e.g., the higher quality does not come at the expense of a more important communication resource), step 530 might comprise determining that the second configuration of the SISO configuration and the MIMO configuration is preferable to the first configuration.

In a second non-limiting exemplary scenario, step 530 may comprise determining that the communication quality associated with communicating utilizing a second of the SISO and MIMO configurations would result in a 10% lower communication quality than communicating utilizing the first of the SISO and MIMO configurations (e.g., as utilized at step 520). Step 530 may then comprise determining whether the 10% lower communication quality is acceptable (e.g., in light of other communication goals and/or needs). Upon determining that the 10% reduction is communication quality is acceptable (e.g., the 10% reduction in communication quality is above the minimum acceptable quality, while enabling other communication goals to be met), then step 530 might comprise determining that the second configuration of the SISO configuration and the MIMO configuration is preferable to the first configuration.

Also for example and without limitation, step 530 may comprise determining that a second configuration of the SISO configuration and the MIMO configuration is preferable to the first configuration based on at least one of: energy (or power) utilization, energy (or power) availability, signal quality, operational cost, data rate, negotiations between communicating systems, and explicit command.

In a non-limiting exemplary scenario, step 530 may comprise determining power utilization corresponding to communicating utilizing a first configuration of the SISO and MIMO configurations. Step 530 may also, for example, comprise determining power utilization corresponding to communicating utilizing a second configuration of the SISO and MIMO configurations. Step 530 may further, for example, comprise determining present and/or future power availability. Step 530 may then, for example, comprise analyzing present and/or anticipated power utilization and present and/ or anticipated power availability to determine that the second configuration of the SISO and MIMO configurations is more appropriate from a power viewpoint than the first configuration of the SISO and MIMO configurations (e.g., in light of communication quality goals).

In another non-limiting exemplary scenario, step 530 may comprise determining operational cost associated with particular configurations. Such costs may, for example, comprise monetary costs associated with communicating through particular communication networks, using particular communication modes, or using particular amounts of communication bandwidth. For example, step 530 might comprise determining that utilizing a second configuration of the SISO and MIMO configurations would correspond to an operating cost savings (e.g., relative to utilizing the first configuration of the SISO and MIMO configurations) while still meeting minimum quality goals. In another example, step 530 might comprise determining to utilize a second configuration of the SISO and MIMO configurations, instead of utilizing the first configuration, based on optimizing operating costs while meeting minimum quality goals.

In still another non-limiting exemplary scenario, step 530 may comprise negotiating between communicating systems to determine and analyze communication capabilities of communicating systems. For example, utilizing a first configuration or a second configuration of the SISO and MIMO configurations may positively or adversely affect other communicating systems. Step 530 may comprise communicating with other communication systems to determine the needs and/or desires of the other communication systems with which the communication system implementing the exemplary method 500 is communicating. Step 530 may then comprise utilizing such information to determine whether to utilize the first or second configurations.

In yet another non-limiting exemplary scenario, step 530 may comprise receiving and analyzing user input to determine whether to utilize a first configuration or a second configuration of the SISO and MIMO configurations. For example, a user may require that a particular number or particular minimum number of transceivers be utilized for communication. Step 530 may, for example, comprise interfacing with the user to obtain such user inpu.

In general, step 530 may comprise determining that a second configuration of the SISO configuration and the MIMO configuration is preferable to the first configuration (e.g., as utilized at step 520). Accordingly, the scope of various aspects of the present invention should not be limited by characteristics of any particular SISO or MIMO configuration or any particular manner of determining whether to utilize a first or second configuration of the SISO and MIMO configurations.

The exemplary method 500 may, at step 540, comprise after determining that a second configuration of the SISO configuration and the MIMO configuration is preferable to the first configuration, communicating using at least one of the plurality of transceivers in the second configuration. As with step 520, step 540 may, for example and without limitation, share various characteristics with steps 320, 350, 360, 420, 430 and 460 of the exemplary methods 300-400 illustrated in FIGS. 3-4 and discussed previously.

Step 540 may comprise communicating using at least one of the plurality of transceivers of the communication system in any of a variety of manners. Continuing the first non-limiting exemplary scenario discussed previously with regard to step 520, step 540 may comprise utilizing more than one of the plurality of transceivers in a MIMO configuration to communicate a communication (e.g., a different communication than communicated at step 520 or a second portion of the same communication). Step 540 may, for example, perform such communication in any of a variety of manners associated with MIMO communications. For example, step 540 may comprise routing information or signals between various MIMO modules (or portions thereof) in the communication system and the more than one of the plurality of transceivers.

Continuing the second non-limiting exemplary scenario discussed previously with regard to step 520, step 540 may comprise utilizing one of the plurality of transceivers in a SISO configuration to communicate a communication (e.g., a different communication than communicated at step 520 or a second portion of the same communication). Step 540 may, for example, perform such communication in any of a variety of manners associated with SISO communications. For example, step 540 may comprise routing information or signals between various SISO modules (or portions thereof) in the communication system and the one of the plurality of transceivers.

In a third non-limiting exemplary scenario, step 520 may comprise communicating communication support information, while step 540 comprises communicating general communication information. In a fourth non-limiting exemplary scenario, steps 520 and 540 may each comprise communicating communication support information and/or general communication information. Accordingly, the scope of various aspects of the present invention should not be limited by characteristics of particular information that may be communicated.

In general, step 540 may comprise, after determining that a second configuration of the SISO configuration and the MIMO configuration is preferable to the first configuration, communicating using at least one of the plurality of transceivers in the second configuration. Accordingly, the scope of various aspects of the present invention should not be limited by characteristics of any particular manner of communicating using a SISO or MIMO configuration.

The exemplary method 500 may, at step 550, comprise performing continued processing. Step 550 may, for example and without limitation, share various characteristics with steps 370 and 470 of the exemplary methods 300-400 illustrated in FIGS. 3-4 and discussed previously.

The exemplary method 500 was presented to provide specific illustrations of generally broader aspects of the present invention. Accordingly, the scope of various aspects of the present invention should not be limited by specific characteristics of the exemplary method 500.

Figure 6:
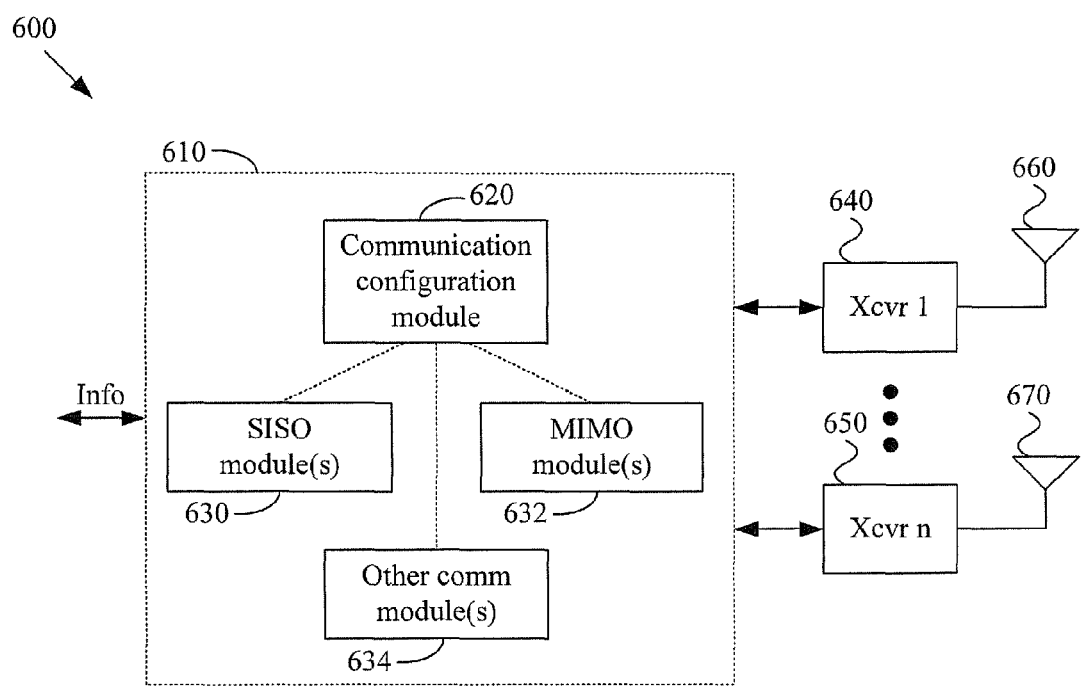
FIG. 6 is a diagram illustrating an exemplary system for managing communication resources in a multi-transceiver communication system configuration, in accordance with various aspects of the present invention.

FIG. 6 is a diagram illustrating an exemplary system 600 for managing communication resources in a multi-transceiver communication system configuration, in accordance with various aspects of the present invention. The exemplary system 600 or components thereof, may for example and without limitation, share various functional characteristics with the exemplary methods 300-500 illustrated in FIGS. 3-5 and discussed previously.

The exemplary system 600 may correspond to, or be integrated with, any of a variety of multi-transceiver communication systems (e.g., communication systems having MIMO communication capability). For example and without limitation, the system 600, or portions thereof, may correspond to various modules or systems of a MIMO communication network (e.g., a base station, access point, or central controller). Also for example, the system 600 may correspond to a fixed or portable MIMO communication system that communicates with a MIMO communication network. Accordingly, the scope of various aspects of the present invention should not be limited by characteristics of a particular communication system that may correspond to, or be integrated with, the exemplary system 600.

The exemplary system 600 may comprise a communication configuration module 620 that generally manages the communication configuration for the exemplary system 600. The exemplary system 600 may also comprise one or more SISO modules 632, one or more MIMO modules 634, and one or more other communication modules 634. The exemplary system 600 may further comprise a plurality of transceivers (e.g., a first transceiver 640 through $n^{th}$ transceiver 650) and corresponding antennas (e.g., a first antenna 660 through $n^{th}$ antenna 670).

The SISO module(s) 630 may generally correspond to any of a variety of hardware and/or software modules or components that support functionality associated with SISO communications. For example and without limitation, the SISO modules 630 may comprise any of a variety of encoders, decoders, multiplexers, de-multiplexers, detectors, converters, signal processors, and any other known SISO components. The scope of various aspects of the present invention should not be limited by characteristics of particular SISO modules or components.

The MIMO module(s) 632 may generally correspond to any of a variety of hardware and/or software modules or components that support functionality associated with MIMO communications. For example and without limitation, the MIMO module(s) 632 may share various characteristics or components with the exemplary MIMO systems 100, 200 illustrated in FIGS. 1-2 and discussed previously. For example, the MIMO module(s) 632 may comprise channel encoders, interleavers, serial-to-parallel converters, MIMO demodulators, de-interleavers, channel decoders, etc. The scope of various aspects of the present invention should not be limited by characteristics of particular MIMO modules or components.

The MIMO module(s) 6.32 may generally comprise various MIMO communication resources, which may be allocated or deployed for communicating a communication, or a portion thereof. In a non-limiting exemplary scenario, such allocated MIMO communication resources may communicate a communication using a plurality of transceivers (e.g., any of the first transceiver 640 through the $n^{th}$ transceiver 650), which in turn communicate signals with a plurality of corresponding antennas (e.g., the first antenna 660 through $n^{th}$ antenna 670).

The other communication module(s) 634 may generally correspond to any of a variety of hardware and/or software modules or components that support functionality associated with communications in addition to SISO or MIMO communications. For example and without limitation, the other communication module(s) 634 may comprise hardware and/or software modules or components that support MISO or beam-forming communications.

The communication configuration module 620 may allocate (or deploy or assign) various SISO module(s) 630, MIMO module(s) 632 or other communication module(s) 6.34 for communicating a communication (i.e., one or more communications). The communication configuration module 620 may also allocate various transceivers 640-650 and/or antennas 660-670 for communicating a communication. The communication configuration module 620, in performing such allocation may, for example, manage time or channel-based allocation of various resources for corresponding communications. The communication configuration module 620, in performing such allocation may, for example, control the routing of signals between various allocated transceivers, antennas, modules, or portions thereof.

In the following discussion, various aspects of the exemplary system 600 will be shown by way of illustrative examples. The following discussion will present at least three non-limiting exemplary scenarios describing various operational aspects of the exemplary system 600. It should be noted that the exemplary scenarios are presented to provide specific illustrative examples of generally broader aspects of the present invention. Accordingly, the scope of various aspects of the present invention should not be limited by characteristics of the following non-limiting exemplary scenarios.

In a first non-limiting exemplary scenario, the exemplary system 600 may communicate a first portion of a first communication using the plurality of transceivers 640-650 (or a portion thereof). The exemplary system 600 or one or more modules thereof, may share various functional characteristics with step 320 of the exemplary method 300 illustrated in FIG. 3 and discussed previously. The communication configuration module 620 may, for example, configure the exemplary system 600 (e.g., allocating various resources) to perform such communication.

The exemplary system 600 may, for example, perform such communication in any of a variety of manners. For example and without limitation, the system 600 may utilize at least a portion the plurality of transceivers 640-650 (e.g., along with corresponding antennas 660-670) and at least a portion of the MIMO module(s) 632 to communicate the first portion of the first communication in a MIMO mode. In a non-limiting example, the system 600 may utilize at least one of the transceivers 640-650 to communicate MIMO set-up and/or training information prior to communicating the first portion of the first communication. Also in various exemplary scenarios, the system 600 may utilize at least a portion of the plurality of transceivers 640-650 and at least a portion of the SISO module(s) 630 and/or other communication module(s) 634 to communicate the first portion of the first communication in a MISO or beam-forming mode. Accordingly, the scope of various aspects of the present invention should not be limited by characteristics of any particular manner of, or apparatus for, using a plurality of transceivers of a communication system to communicate information.

Continuing the first nonlimiting exemplary scenario, the exemplary system 600 (e.g., the communication configuration module 620) may determine to reallocate (or redeploy or reassign) at least one of the plurality of transceivers 640-650 for a second communication. The communication configuration module 620 may, for example and without limitation, share various functional characteristics with step 330 of the exemplary method 300 illustrated in FIG. 3 and discussed previously. The communication configuration module 620 may determine to reallocate at least one of the plurality of transceivers 640-650 for a second communication in any of a variety of manners.

For example and without limitation, the communication configuration module 620 may determine the communication quality associated with communicating a second portion of the first communication using the plurality of transceivers 640-650 less the candidate transceiver(s) to be reallocated. The communication configuration module 620 may then, for example, determine whether to reallocate the candidate transceiver(s) for a second communication based, at least in part, on the determined communication quality.

In a non-limiting example, the communication configuration module 620 may determine that the communication quality associated with communicating a second portion of the first communication using the plurality of transceivers 640-650, less the candidate transceiver(s), would result in a 15% reduction in communication quality between the first and second portions of the first communication. The communication configuration module 620 may then determine whether the 15% reduction in communication quality is acceptable (e.g., in light of other communication goals and/or needs). Upon determining that the 15% reduction in communication quality is acceptable (e.g., the present communication quality is more than 15% above the minimum acceptable quality), the communication configuration module 620 might reallocate the candidate transceiver(s) to the second communication.

In another non-limiting example, the communication configuration module 620 may determine that the communication quality associated with communicating a second portion of the first communication using the plurality of transceivers 640-650, less the candidate transceiver(s), would result in a 10% reduction in communication quality between the first and second portions of the first communication. The communication configuration module 620 may then determine whether the 10% reduction in communication quality is acceptable (e.g., in light of other communication goals and/or needs). Upon determining that the 10% reduction is communication quality is not acceptable (e.g., the present communication quality is only 5% above the minimum acceptable quality), the communication configuration module 620 might determine not to reallocate the candidate transceiver(s).

Also for example and without limitation, the communication configuration module 620 may determine to reallocate at least one of the plurality of transceivers 640-650 for a second communication based on at least one of: energy (or power) utilization, energy (or power) availability, signal quality, operational cost, data rate, negotiations between communicating systems, and explicit command.

In a non-limiting example, the communication configuration module 620 may determine power utilization corresponding to communicating the first communication utilizing the plurality of transceivers 640-650 and utilizing the plurality of transceivers 640-650 less the candidate transceiver(s) for reallocation. The communication configuration module 620 may also, for example, determine power utilization corresponding to communicating the second communication utilizing the candidate transceiver(s). The communication configuration module 620 may further, for example, determine present and/or future power availability. The communication configuration module 620 may then, for example, analyze present and/or anticipated power utilization and present and/or anticipated power availability to determine the most appropriate transceiver allocation from a power viewpoint (e.g., in light of communication quality goals).

In another non-limiting example, the communication configuration module 620 may determine operational cost associated with particular transceiver allocations (or deployments). Such costs may, for example, comprise monetary costs associated with communicating through particular communication networks, using particular communication modes, or using particular amounts of communication bandwidth. For example, the communication configuration module 620 may determine that reallocating one or more of the plurality of transceivers from the first communication to a second communication would correspond to an operating cost savings while still meeting minimum quality goals. In another example, the communication configuration module 620 may determine to reallocate one or more of the plurality of transceivers based on optimizing operating costs while meeting minimum quality goals.

In still another non-limiting example, the communication configuration module 620 may (e.g., utilizing one or more of the transceivers 640-650) negotiate with other communicating systems to determine and analyze communication capabilities of the communicating systems. For example, reallocating (or not reallocating) one or more of the plurality of transceivers may adversely affect other communicating systems. The communication configuration module 620 may communicate with other communication systems to determine the needs and/or desires of the other communication systems with which the system 600 is communicating. The configuration module 620 may then, for example, determine to reallocate (or redeploy or reassign) at least one of the plurality of transceivers for a second communication based, at least in part, on information obtained through such negotiations.

In yet another non-limiting example, the communication configuration module 620 may receive and analyze user input to determine whether to reallocate one or more of the plurality of transceivers 640-650 (e.g., and/or corresponding antennas) for a second communication. For example, a user may require that a particular number or particular minimum number of transceivers be utilized for the first and/or second communications. The communication configuration module 620 may, for example, utilize a user interface module to interface with the user to obtain such user input.

In general, the communication configuration module 620 may determine to reallocate at least one of the plurality of transceivers 640-650 (e.g., as previously allocated for a first communication) for a second communication. Accordingly, the scope of various aspects of the present invention should not be limited by characteristics of any particular transceiver reallocation or any particular manner of, or apparatus for, determining whether to perform such reallocation.

Continuing the first non-limiting exemplary scenario, the exemplary system 600 (e.g., the communication configuration module 620) may reallocate (or redeploy or reassign) at least one of the plurality of transceivers 640-650 for performing the second communication (e.g., in response to making the determination to reallocate the transceiver(s), as discussed previously). The communication configuration module 620 may, for example and without limitation, share various functional characteristics with step 340 of the exemplary method 300 illustrated in FIG. 3 and discussed previously. The communication configuration module 620 may perform such reallocation in any of a variety of mariners.

The communication configuration module 620 may, for example, maintain a cross-list of each of the plurality of transceivers 640-650 to respective communications. Also for example, the communication configuration module 620 may maintain allocation flags, arrays and/or tables. The communication configuration module 620 may also, for example, utilize one or more of the plurality of transceivers 640-650 to communicate communication support information (e.g., protocol information, secure communication information, MIMO training information, etc.). The communication configuration module 620 may, as discussed previously, control the routing of signals (e.g., utilizing digital hardware and/or software switching) between the various SISO module(s) 630, MIMO module(s) 632, other communication module(s) 634 and the plurality of transceivers 640-650. Accordingly, the scope of various aspects of the present invention should not be limited by characteristics of any particular manner of, or apparatus for, reallocating one or more transceivers from one communication to another.

Continuing the first non-limiting exemplary scenario, the exemplary system 600 may communicate a second portion of the first communication using the plurality of transceivers 640-650 less the reassigned transceiver(s). The exemplary system 600 (or portions thereof) may, for example and without limitation, share various functional characteristics with step 350 of the exemplary method 300 illustrated in FIG. 3 and discussed previously. The exemplary system 600 may perform such communication in any of a variety of manners.

In a non-limiting example, the system 600 may utilize N transceivers (e.g., at least a portion of the first through $n^{th}$ transceivers 640-650) to communicate the first portion of the first communication. The communication configuration module 620 may then reallocate M of the N transceivers to a second communication, leaving N-M transceivers for communicating a second portion of the first communication. The exemplary system 600 may then, for example, utilize the N-M transceivers in a MIMO configuration to communicate the second portion of the first communication. In doing so, the system 600 may, for example prior to communicating the second portion of the first communication, utilize one or more of the transceivers 640-650 to communicate MIMO training information for use with order N-M MIMO communications. Also, the exemplary system 600 may, for example, utilize one or more of the transceivers 640-650 to communicate various types of information to synchronize communication of the second portion of the first communication with the first portion.

In another non-limiting example, the exemplary system 600 may utilize N transceivers (e.g., at least a portion of the first through $n^{th}$ transceivers 640-650) to communicate the first portion of the first communication. The communication configuration module 620 may then reallocate N-1 of the N transceivers to a second communication, leaving one transceiver (e.g., the first transceiver 640) for communicating a second portion of the first communication. The system 600 may then, for example prior to communicating the second portion of the first communication, utilize at least one of the transceivers 640-650 to communicate various communication support information (e.g., protocol and decoder information). Also, the system 600 may, for example, utilize one or more of the transceivers 640-650 to communicate various types of information to synchronize communication of the second portion of the first communication with the first portion.

In general the exemplary system 600 may communicate a second portion of the first communication using the plurality of transceivers 640-650 (e.g., previously utilized to communicate the first portion of the first communication) less the reallocated at least one of the plurality of transceivers (e.g., as reallocated to communicate the second communication). Accordingly, the scope of various aspects of the present invention should not be limited by characteristics of any particular manner of, or apparatus for, using a plurality of transceivers (or a single transceiver) for communicating information, or by any particular manner of, or apparatus for, synchronizing communication of separate portions of a communication.

Continuing the first non-limiting exemplary scenario, the exemplary system 600 may also communicate the second communication using the reallocated at least one of the plurality of transceivers concurrently with (e.g., simultaneously with) communicating the second portion of the first communication. The exemplary system 600 may perform such communication in any of a variety of manners. For example and without limitation, the exemplary system 600 (or portions thereof) may share various functional characteristics with step 360 of the exemplary method 300 illustrated in FIG. 3 and discussed previously.

For example, the exemplary system 600 may communicate the second communication from the beginning of the second communication. Also for example, the exemplary system 600 may communicate a second portion of the second communication, where the first portion of the second communication might have already been communicated (e.g., without the reallocated transceiver(s)).

In a non-limiting example, the exemplary system 600 may have utilized N transceivers (e.g., at least a portion of the first through $n^{th}$ transceivers 640-650) to communicate the first portion of the first communication. The communication configuration module may then have reallocated M of the N transceivers to a second communication, leaving N-M transceivers for communicating a second portion of the first communication. The exemplary system 600 may then, for example, use the M reallocated transceiver(s) in a MIMO configuration to communicate the second communication (or a portion thereof). In doing so, the exemplary system 600 may, for example prior to communicating the second communication, utilize one or more of the transceivers 640-650 to communicate MIMO training information for use with order-M (or higher order) MIMO communications. Also, in an example where a first portion of the second communication has already been communicated, the exemplary system 600 may, for example, utilize one or more of the transceivers 640-650 to communicate any of a variety of synchronization information to be utilized to synchronize communication of the first and second portions of the second communication.

In general, the exemplary system 600 may communicate the second communication using at least the reallocated transceiver(s) concurrently with (e.g., simultaneously with) communicating the second portion of the first communication. Accordingly, the scope of various aspects of the present invention should not be limited by characteristics of any particular manner of, or apparatus for, using a plurality of transceivers (or a single transceiver) for communicating information or by any particular manner of, or apparatus for, synchronizing communication of separate portions of a communication.

The first non-limiting exemplary scenario was presented to provide specific illustrations of generally broader aspects of the present invention. Accordingly, the scope of various aspects of the present invention should not be limited by specific characteristics of the first non-limiting exemplary scenario.

In a second non-limiting exemplary scenario, the exemplary system 600 may communicate a first communication utilizing the first transceiver 640 of the plurality of transceivers 640-650. The exemplary system 600 (or portions thereof) may, for example and without limitation, share various functional characteristics with step 420 of the exemplary method 400 illustrated in FIG. 4 and discussed previously.

The exemplary system 600 may communicate the first communication utilizing the first transceiver 640 in any of a variety of manners. For example and without limitation, the exemplary system 600 may communicate the first communication utilizing at least a portion of the SISO module(s) 630 and the first transceiver 640 in a SISO configuration. Also for example, the exemplary system 600 may communicate the first communication utilizing at least a portion of the MIMO module(s) 632, the first transceiver 640 and other transceivers in a MIMO configuration. Accordingly, the scope of various aspects of the present invention should not be limited by characteristics of any particular manner of, or mechanism for, utilizing one or more transceivers to communicate.

Continuing the second non-limiting exemplary scenario, the exemplary system 600 may communicate a second communication utilizing a second transceiver (e.g., the n$^{th}$ transceiver 650) of the plurality of transceivers 640-650. The exemplary system 600 may, for example and without limitation, share various functional characteristics with step 430 of the exemplary method 400 illustrated in FIG. 4 and discussed previously.

The exemplary system 600 may communicate the second communication utilizing the second transceiver (e.g., the n$^{th}$ transceiver) in any of a variety of manners. For example and without limitation, the system 600 may communicate the second communication utilizing at least a portion of the SISO module(s) 630 and the second transceiver in a SISO configuration. Also for example, the exemplary system 600 may communicate the second communication utilizing at least a portion of the MIMO module(s) 632, the second transceiver and other transceiver(s) in a MIMO configuration.

The exemplary system 600 may, for example and without limitation, communicate the second communication concurrently with (e.g., simultaneously with) communicating at least a portion of the first communication. In an alternative example, the system 600 may communicate the second communication consecutively with communication of the first communication.

In general, the exemplary system 600 may communicate a second communication utilizing a second transceiver of the plurality of transceivers 640-650. Accordingly, the scope of various aspects of the present invention should not be limited by characteristics of any particular manner of, or apparatus for, utilizing one or more transceivers to communicat.

Continuing the second non-limiting exemplary scenario, the exemplary system 600 (e.g., the communication configuration module 620) may determine to utilize the first transceiver 640 and the second transceiver (e.g., the n$^{th}$ transceiver 650), along with at least a portion of the MIMO module(s) 632, in a MIMO configuration (e.g., with or without other transceivers) to communicate information. The communication configuration module 620 may, for example and without limitation, share various functional characteristics with step 440 of the exemplary method 400 illustrated in FIG. 4 and discussed previously. The communication configuration module 620 may make such a determination in any of a variety of manners.

Note that the information, which the communication configuration module 620 determines to communicate utilizing at least the first and second transceivers in a MIMO configuration, may comprise a second portion of the first communication (e.g., as communicated previously) and/or a second portion of the second communication (e.g., as communicated previously). Alternatively, for example, the information may comprise information independent of the first communication and second communication.

For example and without limitation, the communication configuration module 620 may determine the communication quality associated with communicating the communication utilizing none, either or both of the first transceiver 640 and the second transceiver (e.g., the n$^{th}$ transceiver 650). The communication configuration module 620 may then, for example, determine whether to utilize at least the first transceiver 640 and the second transceiver in a MIMO configuration based, at least in part, on the determined communication quality.

For example, the communication configuration module 620 may determine first communication quality associated with utilizing one of the first transceiver 640 or the second transceiver in a SISO configuration. The communication configuration module 620 may then, for example, determine second communication quality associated with utilizing the first transceiver 640 and the second transceiver in a MIMO configuration (with or without other transceivers). The communication configuration module 620 may then, for example, determine whether to utilize the first transceiver 640 and the second transceiver in a MIMO configuration based, at least in part, on the first communication quality and the second communication quality.

Also for example and without limitation, the communication configuration module 620 may determine whether to utilize the first transceiver 640 and the second transceiver in a MIMO configuration based on at least one of: energy (or power) utilization, energy (or power) availability, signal quality, operational cost, data rate, negotiations between communicating systems, and explicit command.

In general, the communication configuration module 620 may determine to utilize the first transceiver 640 and the second transceiver in a MIMO configuration (e.g., with or without other transceivers) to communicate information. Accordingly, the scope of various aspects of the present invention should not be limited by characteristics of any particular manner of, or apparatus for, determining whether to utilize transceivers in a MIMO configuration.

Continuing the second non-limiting exemplary scenario, the exemplary system 600 (e.g., the communication configuration module 620 may configure the system 600 to communicate information utilizing at least the first transceiver 640 and the second transceiver (e.g., the $n^{th}$ transceiver 650) in a MIMO configuration. The communication configuration module 620 may, for example and without limitation, share various functional characteristics with step 450 of the exemplary method 400 illustrated in FIG. 4 and discussed previously.

The communication configuration module 620 may configure the system 600 in any of a variety of manners. For example and without limitation, the communication configuration module 620 may maintain a cross-list of transceivers to respective communications. Also for example, the communication configuration module 620 may maintain allocation flags, arrays and/or tables. The communication configuration module 620 may also, for example, control the routing of communication signals between the various MIMO module(s) 632, the first transceiver 640 and at least the second transceiver (e.g., the $n^{th}$ transceiver 650).

The communication configuration module 620 may also, for example, utilize at least one of the transceivers 640-650 to communicate MIMO training information between communicating systems. The communication configuration module 620 may further, for example, utilize at least one of the transceivers 640-650 to communicate any of a variety of communication support information, which may be utilized for initiating a new communication or for continuing an existing communication. Accordingly, the scope of various aspects of the present invention should not be limited by characteristics of a particular manner of, or apparatus for, configuring a communication system to communicate information in a MIMO mode.

Continuing the second non-limiting exemplary scenario, the exemplary system 600 may communicate the information utilizing at least a portion of the MIMO module(s) 632, the first transceiver 640 and the second transceiver in a MIMO configuration. The communication configuration module 620 may, for example and without limitation, share various characteristics with step 460 of the exemplary method 400 illustrated in FIG. 4 and discussed previously. The communication configuration module 620 may, for example, communicate the information utilizing at least the first transceiver 640 and the second transceiver in a MIMO configuration in any of a variety of known, or yet to be developed manners.

The second non-limiting exemplary scenario was presented to provide specific illustrations of generally broader aspects of the present invention. Accordingly, the scope of various aspects of the present invention should not be limited by specific characteristics of the second non-limiting exemplary scenario.

In a third non-limiting exemplary scenario, the exemplary system 600 may communicate using at least one of a plurality of transceivers 640-650 in a first configuration of a SISO configuration and a MIMO configuration (e.g., utilizing the SISO module(s) 630 and MIMO module(s) 632 as appropriate). The exemplary system 600 may, for example and without limitation, share various functional characteristics with step 520 of the exemplary method 500 illustrated in FIG. 5 and discussed previously.

As discussed previously, the exemplary system 600 may communicate using at least one of the plurality of transceivers 640-650 in any of a variety of manners. In a first non-limiting example, the exemplary system 600 may utilize one of the plurality of transceivers 640-650 in a SISO configuration to communicate a communication (or a first portion thereof). The exemplary system 600 may, for example, perform such communication in any of a variety of manners associated with SISO communications. For example, the system 600 (e.g., the communication configuration module 620) may route information or signals between various SISO module(s) 630 (or portions thereof) and the one of the plurality of transceivers 640-650.

In a second non-limiting example, the exemplary system 600 may utilize more than one of the plurality of transceivers 640-650 in a MIMO configuration to communicate a communication (or a first portion thereof). The exemplary system 600 may, for example, perform such communication in any of a variety of manners associated with MIMO communications. For example, the system 600 (e.g., the communication configuration module 620) may route information or signals between various MIMO module(s) 632 (or portions thereof) and the more than one of the plurality of transceivers 640-650.

In general, the exemplary system 600 may communicate using at least one of a plurality of transceivers 640-650 in a first configuration of a SISO configuration and a MIMO configuration. Accordingly, the scope of various aspects of the present invention should not be limited by characteristics of any particular manner of, or apparatus for, communicating using a SISO or MIMO configuration.

Continuing the third non-limiting exemplary scenario, the exemplary system 600 (e.g., the communication configuration module 620) may determine that a second configuration of the SISO configuration and the MIMO configuration is preferable to the first configuration. The communication configuration module 620 may, for example and without limitation, share various functional characteristics with step 530 of the exemplary method 500 illustrated in FIG. 5 and discussed previously.

The communication configuration module 620 may determine that a second configuration of the SISO configuration and the MIMO configuration is preferable to the first configuration in any of a variety of manners. For example and without limitation, the communication configuration module 620 may determine a first communication quality associated with communicating utilizing a first of the SISO and MIMO configurations and a second communication quality associated with communicating utilizing a second of the SISO and MIMO configurations. The communication configuration module 620 may then, for example, determine whether to utilize the first or the second of the SISO and MIMO configurations based, at least in part, on the determined first and second communication qualities.

Also for example and without limitation, the communication configuration module 620 may determine that a second configuration of the SISO configuration and the MIMO configuration is preferable to the first configuration based on at least one of: energy (or power) utilization, energy (or power) availability, signal quality, operational cost, data rate, negotiations between communicating systems, and explicit command.

In general, the communication configuration module 620 may determine that a second configuration of the SISO configuration and the MIMO configuration is preferable to the first configuration (e.g., as utilized previously). Accordingly, the scope of various aspects of the present invention should not be limited by characteristics of any particular SISO or MIMO configuration or any particular manner of, or apparatus for, determining whether to utilize a first or second configuration of the SISO and MIMO configurations.

Continuing the third non-limiting exemplary scenario, the exemplary system 600 may, after determining that a second configuration of the SISO configuration and the MIMO configuration is preferable to the first configuration, communicate using at least one of the plurality of transceivers 640-650 in the second configuration. The exemplary system 600 may, for example and without limitation, share various functional characteristics with step 540 of the exemplary method 500 illustrated in FIG. 5 and discussed previously.

The exemplary system 600 may communicate using at least one of the plurality of transceivers of the communication system in any of a variety of manners. Continuing the first example, discussed previously, the system 600 may utilize more than one of the plurality of transceivers 640-650 in a MIMO configuration to communicate a communication (e.g., a different communication than communicated previously in the SISO configuration or a second portion of the same communication). The system 600 may, for example, perform such communication in any of a variety of manners associated with MIMO communications. For example, the communication configuration module 620 may route information or signals between various MIMO module(s) 632 (or portions thereof) and the more than one of the plurality of transceivers 640-650.

Continuing the second example, discussed previously, the system 600 may utilize one of the plurality of transceivers 640-650 in a SISO configuration to communicate a communication (e.g., a different communication than communicated previously in the MIMO configuration or a second portion of the same communication). The system 600 may, for example, perform such communication in any of a variety of manners associated with SISO communications. For example, the communication configuration module 620 may route information or signals between various SISO module(s) 630 (or portions thereof) and the one of the plurality of transceivers 640-650.

In another non-limiting example, the exemplary system 600 may communicate communication support information using a first configuration of the SISO and MIMO configurations, while the exemplary system 600 communicates general communication information using a second configuration of the SISO and MIMO configurations. In yet another example, the exemplary system 600 may communicate communication support information and/or general communication information using each of the first and second of the SISO and MIMO configurations. Accordingly, the scope of various aspects of the present invention should not be limited by characteristics of particular information that the exemplary system 600 may communicate.

In general, the exemplary system 600 may, after determining that a second configuration of the SISO configuration and the MIMO configuration is preferable to the first configuration, communicate using at least one of the plurality of transceivers in the second configuration. Accordingly, the scope of various aspects of the present invention should not be limited by characteristics of any particular manner of, or apparatus for, communicating using a SISO or MIMO configuration.

The third non-limiting exemplary scenario was presented to provide specific illustrations of generally broader aspects of the present invention. Accordingly, the scope of various aspects of the present invention should not be limited by specific characteristics of the third non-limiting exemplary scenario. Additionally, the exemplary system 600 was presented to provide specific illustrations of generally broader aspects of the present invention. Accordingly, the scope of various aspects of the present invention should not be limited by specific characteristics of the exemplary system 600.

The exemplary system 600, and modules or components thereof, may be implemented in hardware, software or a combination thereof. Also, various modules may share various hardware and/or software sub-modules. As a non-limiting example, a first module and a second module may share processing hardware or may share various software code segments. Accordingly, the scope of various aspects of the present invention should not be limited by any particular hardware or software implementation of the exemplary system 600 (or portions thereof) or by any arbitrary notion of boundaries between modules.

In addition, the exemplary system 600 may be implemented in any of a variety of degrees of integration. For example, the entire system 600 may be implemented on a single integrated circuit. Also for example, the entire system 600, except for the antennas, may be integrated on a single integrated circuit. Further for example, the exemplary system 600 may be implemented on a plurality of integrated circuits. Accordingly, the scope of various aspects of the present invention should not be limited by characteristics of a particular degree of integration or distribution.

In summary, various aspects of the present invention provide a system and method for dynamic reconfiguration of communication resources in a multi-transceiver configuration. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   communicating a first portion of a first communication using a first set of MIMO communication resources of a communication system;
   determining to reallocate a selected resource from the first set of MIMO communication resources for performing a second communication;
   while communicating the first communication, reallocating the selected resource for performing the second communication;
   communicating a second portion of the first communication using the first set of MIMO communication resources but without using the selected resource; and
   while communicating the second portion of the first communication, communicating the second communication using the selected resource.

2. The method of claim 1, wherein determining to reallocate a selected resource from the first set of MIMO communication resources for performing a second communication comprises:
   determining a first communication quality associated with communicating the second portion of the first communication using the first set of MIMO communication resources but without using the selected resource; and determining to reallocate the selected resource for the second communication in view of the first communication quality.

3. The method of claim 1, wherein determining to reallocate a selected resource from the first set of MIMO communication resources for performing a second communication comprises:

determining to reallocate the selected resource from the first set of MIMO communication resources for the second communication in view of energy use associated with transmitting the second portion of the first communication using the first set of MIMO communication resources but without using the selected resource.

4. The method of claim 3, wherein determining to reallocate a selected resource from the first set of MIMO communication resources for performing a second communication comprises:

determining to reallocate the selected resource from the first set of MIMO communication resources for the second communication in view of: signal quality, data rate, or both.

5. The method of claim 1, wherein determining to reallocate a selected resource from the first set of MIMO communication resources for performing a second communication comprises determining to reallocate the selected resource from the first set of MIMO communication resources for the second communication in view of: operational cost, negotiations between communicating systems, user command, or any combination thereof.

6. The method of claim 1, wherein determining to reallocate the selected resource from the first set of MIMO communication resources for performing a second communication comprises:

determining to reallocate a selected resource from the first set of MIMO communication resources for the second communication in view of power, energy availability, or both.

7. The method of claim 1, wherein the selected resource from the first set of MIMO communication resources comprises a transceiver.

8. The method of claim 1, wherein the selected resource from the first set of MIMO communication resources comprises an antenna.

9. A method comprising:

communicating a first portion of a first communication using a first set of MIMO communication resources of a communication system without using an additional MIMO communication resource of the communication system;

while communicating the first portion of the first communication, determining to use a second set of MIMO communication resources of the communication system to communicate a second portion of the first communication, where the second set of MIMO communication resources comprises the first set of MIMO communication resources and the additional MIMO communication resource;

configuring the communication system to communicate the second portion of the first communication by allocating the additional MIMO communication resource to the second set of MIMO communication resources; and communicating the second portion of the first communication using the second set of MIMO communication resources.

10. The method of claim 9, wherein determining to use a second set of MIMO communication resources to communicate a second portion of the first communication comprises:

determining to use the second set of MIMO communication resources in view of anticipated energy, power use, or both, associated with transmitting the second portion of the first communication using the second set of MIMO communication resources.

11. The method of claim 9, wherein determining to use a second set of MIMO communication resources to communicate a second portion of the first communication comprises:

determining to use the second set of MIMO communication resources in view of power, energy availability, or both.

12. The method of claim 9, wherein determining to use the second set of MIMO communication resources to communicate a second portion of the first communication comprises:

determining a first communication quality associated with using the first set of MIMO communication resources to communicate the second portion of the first communication;

determining a second communication quality associated with using the second set of MIMO communication resources to communicate the second portion of the first communication; and determining to use the second set of MIMO communication resources in view of the first communication quality and the second communication quality.

13. The method of claim 9, wherein determining to use the second set of MIMO communication resources to communicate a second portion of the first communication comprises:

determining to use the second set of MIMO communication resources in view of: operational cost, negotiations between communicating systems, user command, or any combination thereof.

14. The method of claim 9, wherein determining to use the second set of MIMO communication resources to communicate a second portion of the first communication comprises:

determining to use the second set of MIMO communication resources in view of any combination of communication quality concerns and non-quality concerns.

15. The method of claim 9, wherein the additional MIMO communication resource of the communication system comprises a transceiver.

16. The method of claim 9, wherein the additional MIMO communication resource of the communication system comprises an antenna.

17. A system comprising:

a module comprising electrical hardware, the module operable to:

communicate a first portion of a first communication using a first set of MIMO communication resources of the system;

determine to reallocate a selected resource from the first set of MIMO communication resources for performing a second communication;

while communicating the first communication, reallocate the selected resource for performing the second communication;

communicate a second portion of the first communication using the first set of MIMO communication resources but without using the selected resource; and while communicating the second portion of the first communication, communicate the second communication using the selected resource.

18. The system of claim 17, wherein the module is operable to reallocate a selected resource from the first set of MIMO communication resources for performing a second communication by operating to:
- determine a first communication quality associated with communicating a second portion of the first communication using the first set of MIMO communication resources but without using the selected resource; and
- determine to reallocate the selected resource for a second communication in view of the first communication quality.

19. The system of claim 17, wherein the module is operable to:
- determine to reallocate a selected resource from the first set of MIMO communication resources for performing a second communication in view of energy use associated with transmitting the second portion of the first communication using the first set of MIMO communication resources but without using the selected resource.

20. The system of claim 17, wherein the module is operable to:
- determine to reallocate a selected resource from the first set of MIMO communication resources for performing the second communication in view of: signal quality, data rate, or both.

21. The system of claim 17, wherein the module is operable to:
- determine to reallocate a selected resource from the first set of MIMO communication resources for performing a second communication in view of: operational cost, negotiations between communicating systems, user command, or any combination thereof.

22. The system of claim 17, wherein the module is operable to:
- determine to reallocate a selected resource from the first set of MIMO communication resources for performing a second communication in view of power, energy availability, or both.

23. The system of claim 17, wherein the selected resource from the first set of MIMO communication resources comprises a transceiver.

24. The system of claim 17, wherein the selected resource from the first set of MIMO communication resources comprises an antenna.

25. A system comprising:
- a module comprising electrical hardware, the module operable to:
  - communicate a first portion of a first communication using a first set of MIMO communication resources of the system without using an additional MIMO communication resource of the system;
  - while communicating the first portion of the first communication, determine to use a second set of MIMO communication resources of the system to communicate a second portion of the first communication, where the second set of MIMO communication resources comprises the first set of MIMO communication resources and the additional MIMO communication resource;
  - configure the communication system to communicate the second portion of the first communication by allocating the additional MIMO communication resource to the second set of MIMO communication resources; and
  - communicate the second portion of the first communication using the second set of MIMO communication resources.

26. The system of claim 25, wherein the module is operable to:
- determine to use a second set of MIMO communication resources to communicate a second portion of the first communication in view of anticipated energy, power use, or both, associated with transmitting the second portion of the first communication using the second set of MIMO communication resources.

27. The system of claim 25, wherein the module is operable to:
- determine to use a second set of MIMO communication resources to communicate a second portion of the first communication in view of power, energy availability, or both.

28. The system of claim 25, wherein the module is operable to use the second set of MIMO communication resources to communicate a second portion of the first communication by operating to:
- determine a first communication quality associated with using the first set of MIMO communication resources to communicate the second portion of the first communication;
- determine a second communication quality associated with using the second set of MIMO communication resources to communicate the second portion of the first communication; and
- determine to use the second set of MIMO communication resources in view of the first communication quality and the second communication quality.

29. The system of claim 25, wherein the module is operable to:
- determine to use a second set of MIMO communication resources to communicate a second portion of the first communication in view of: operational cost, negotiations between communicating systems, user command, or any combination thereof.

30. The system of claim 25, wherein the module is operable to:
- determine to use a second set of MIMO communication resources to communicate a second portion of the first communication in view of any combination of communication quality concerns and non-quality concerns.

31. The system of claim 25, wherein the additional MIMO communication resource of the communication system comprises a transceiver.

32. The system of claim 25, wherein the additional MIMO communication resource of the communication system comprises an antenna.

* * * * *